United States Patent
Muncaster et al.

(10) Patent No.: US 7,686,903 B2
(45) Date of Patent: Mar. 30, 2010

(54) STRESS-RELIEVING BARRIER MEMBRANE FOR CONCRETE SLABS AND FOUNDATION WALLS

(75) Inventors: John W. Muncaster, Ennis, TX (US); Tony Joe Millican, Waxahachie, TX (US)

(73) Assignee: Polyguard Products, Inc., Ennis, TX (US)

(*) Notice: Subject to any disclaimer, the term of this patent is extended or adjusted under 35 U.S.C. 154(b) by 0 days.

(21) Appl. No.: 12/317,165

(22) Filed: Dec. 22, 2008

(65) Prior Publication Data

US 2009/0159177 A1 Jun. 25, 2009

Related U.S. Application Data

(62) Division of application No. 10/784,410, filed on Feb. 23, 2004, now Pat. No. 7,488,523.

(51) Int. Cl.
- *E04B 2/84* (2006.01)
- *E04F 13/00* (2006.01)
- *B29C 65/08* (2006.01)
- *B32B 38/10* (2006.01)

(52) U.S. Cl. .................... 156/71; 156/247; 156/249

(58) Field of Classification Search .............. 156/71, 156/247, 249; 428/40.1, 40.3, 147, 142, 428/189–191, 489, 490; 404/17, 18, 82, 404/70, 31–33, 40.1, 40.3, 147, 142, 189–191, 404/489, 490

See application file for complete search history.

(56) References Cited

U.S. PATENT DOCUMENTS

| | | | | |
|---|---|---|---|---|
| 3,474,625 A | * | 10/1969 | Bennett et al. | 405/270 |
| 3,741,856 A | * | 6/1973 | Hurst | 442/150 |
| 3,937,640 A | * | 2/1976 | Tajima et al. | 156/71 |
| 4,386,981 A | * | 6/1983 | Clapperton | 156/71 |
| 4,442,148 A | * | 4/1984 | Stierli | 428/40.3 |
| 4,464,215 A | * | 8/1984 | Cogliano | 156/71 |
| 4,622,252 A | * | 11/1986 | Strobeck | 428/88 |
| 4,636,414 A | * | 1/1987 | Tajima et al. | 428/40.3 |
| 4,684,288 A | * | 8/1987 | Chapa | 404/35 |
| 4,775,567 A | * | 10/1988 | Harkness | 428/40.3 |
| 4,992,315 A | * | 2/1991 | Zickell et al. | 428/40.3 |
| 5,096,759 A | * | 3/1992 | Simpson et al. | 428/40.3 |
| 5,132,183 A | * | 7/1992 | Gaidis et al. | 428/489 |
| 5,143,766 A | * | 9/1992 | Wenz et al. | 428/40.3 |
| 5,246,306 A | * | 9/1993 | Shoesmith et al. | 404/70 |
| 5,250,340 A | * | 10/1993 | Bohnhoff | 428/99 |
| 5,263,792 A | * | 11/1993 | Davis et al. | 405/45 |
| 5,389,166 A | * | 2/1995 | White | 156/71 |

(Continued)

*Primary Examiner*—Philip C Tucker
*Assistant Examiner*—Sing P Chan
(74) *Attorney, Agent, or Firm*—Jack A. Kanz

(57) ABSTRACT

A composite membrane comprising a layer of rubberized asphalt having a heavy duty plastic film layer continuously bonded to one side and, optionally, a layer of nonwoven geotextile continuously bonded to the other side. The membrane can be used in vertical or horizontal applications, and is particularly useful for its stress-relief properties that resist crack formation and propagation in concrete walls and slabs in addition to serving as a barrier to moisture, toxic substances and insects. An appropriate composite membrane of the invention can be advantageously utilized in positive side, blindside, underslab or split slab applications. The thickness of the composite membrane preferably ranges from about 30 mils to about 150 mils.

20 Claims, 2 Drawing Sheets

U.S. PATENT DOCUMENTS

| | | | |
|---|---|---|---|
| 5,393,559 A * | 2/1995 | Shoesmith et al. | 427/136 |
| 5,513,925 A * | 5/1996 | Dempsey et al. | 404/17 |
| 5,763,036 A * | 6/1998 | Terry et al. | 428/40.1 |
| 5,979,133 A * | 11/1999 | Funkhouser | 52/408 |
| 6,171,984 B1 * | 1/2001 | Paulson et al. | 442/331 |
| 6,518,330 B2 * | 2/2003 | White et al. | 523/200 |
| 6,546,679 B1 * | 4/2003 | Bushberger | 52/169.14 |
| 2001/0002497 A1 * | 6/2001 | Scuero | 14/73 |
| 2002/0037405 A1 * | 3/2002 | Naipawer et al. | 428/351 |
| 2004/0031223 A1 * | 2/2004 | Durning et al. | 52/309.17 |

* cited by examiner

STRESS-RELIEVING BARRIER MEMBRANE FOR CONCRETE SLABS AND FOUNDATION WALLS

This application is a division of U.S. application Ser. No. 10/784,410 filed Feb. 23, 2004, now U.S. Pat. No. 7,488,523 issued Feb. 10, 2009.

FIELD OF THE INVENTION

This invention relates to membranes useful for resisting the formation or propagation of cracks in concrete slabs and foundation walls; for stabilizing, rehabilitating and relieving stress around cracks and joints in such slabs and walls; and for forming a permanent seal against the migration of moisture, insects, pesticides, gases and toxic contaminants through cracks and joints in such slabs and walls.

DESCRIPTION OF RELATED ART

Architects and builders have long been aware of the need for keeping water and moisture away from underneath concrete slabs. Problems of indoor air quality and mold can be caused by moisture coming through the concrete slab. Additionally, toxic contaminants from pesticides and other chemicals, moisture vapor and insects can penetrate through joints and cracks in slabs. Cracks are frequently caused by factors such as settlement of the base, structural stresses from the building, expansive soils, freeze/thaw cycling, thermal expansion and contraction, and loads from building contents, occupants and vehicles. In some cases, cardboard-based products have previously been used under slabs poured over expansive soils. When wet, the cardboard will rot away to create stress-relieving voids. However, if the cardboard remains dry, it will not rot away and its capability for relieving stresses is reduced significantly.

To prevent moisture penetration, designers have also used "vapor barriers," which generally have been rolls of polyethylene film, usually about 6 mils thick, rolled out with the slab poured over it. Over time, numerous problems have been experienced with such barriers. Conventional vapor barriers often get torn apart by construction activities and traffic, rendering them ineffective. They are also often torn and punctured by base settlement, building movement, joint movements, and cracks occurring in the slab above. Few conventional vapor barriers comprise a material that will adhere to a concrete slab poured on top. As a result, there has been growing concern in recent years with indoor air quality, flooring delamination and mold, which is sometimes referred to as the "sick building syndrome."

Materials suppliers have responded with thicker vapor barriers (e.g., 10-46 mils), some with improved stretch properties. Most of these vapor barriers are not adhered to the underside of the slab. One of these suppliers offers a thicker vapor barrier (32-46 mils, including adhesive) incorporating an adhesive which creates a chemical bond to the concrete slab when the slab is poured. However, although these improved vapor barriers are proven by lab tests to be more resistant to tearing and puncturing, they do not have a long track record proving that the increased thickness and puncture resistance are sufficient to withstand the stress of construction and long term building operation. Moreover, they have no effect on reducing the amount or severity of the slab cracking.

More recently, other materials have been disclosed for use in various ways for waterproofing, for protecting foundations, for improving subsurface drainage, and for subgrade stabilization. Such materials include, for example, rubberized asphalt or bitumen in the form of a thixotropic liquid or membrane. Bitumen is often modified with plastomers or elastomers to give it better stability and durability. Multilayered composite sheets consisting of an exceptionally tough high density polyethylene film, a synthetic pressure-sensitive adhesive and a protective coating are marketed as waterproofing membranes by Grace Construction Products, a division of W.R. Grace & Co. In particular, membranes marketed under the trade names "Preprufe 160" and "Preprufe 300" have thicknesses of 1.07 mm (42 mils) and 1.42 mm (56 mils), respectively. W.R. Grace & Co. also markets a composite sheet of rubberized asphalt and cross-laminated polyethylene film under the trademark Bituthene® 3000. This material, which has a total thickness of about 1.5 mm, is recommended for all horizontal and vertical waterproofing of structural concrete above and below grade.

Highway engineers have long used highway underseal membranes during pavement rehabilitation. A typical application is to install highway undersea membranes over joints or cracks of the old pavement being rehabilitated, then to install a new layer of asphalt pavement over the old pavement. The departments of transportation in a number of states have documented research showing that the use of highway underseal membranes consistently reduces both the amount and severity of cracking in the new pavement layer installed above it. These reports generally attribute the reduction in cracking to the stress relief property of a rubberized asphalt component in the highway underseal membrane.

Although highway underseal is not known to have been used to reduce cracking of concrete slabs, the stress-relieving properties of rubberized asphalt have been used in building construction for the purpose of reducing cracking in ceramic tile floors. In this application, the product, often referred to as "anti-fracture membrane" or "crack isolation membrane" is installed over the floor substrate (generally concrete or wood), which is to receive the ceramic floor tile. On top of the anti-fracture membrane is installed a setting bed (usually latex modified) and then the ceramic tile. There is a growing acceptance among building designers and contractors that the use of anti-fracture membrane reduces the amount of ceramic tile cracking by relieving stress created by cracking or movement of the floor substrate underneath the tile.

Woven and nonwoven geotextiles comprising polypropylene, polyester, high density polyethylene and nylon have also been recognized for use in soil stabilization and reinforcement, for erosion control, and for preventing infiltration of fine particulate soils into gravel drains, perforated piping, and the like. Geotextiles are strong, durable and chemically inert materials that are said to be virtually unaffected by the effects of ground conditions, weather and aging, and are commercially available in either woven or nonwoven form. Nonwoven geotextiles can comprise long, continuous filaments that are thermally bonded, or short staple fibers that are bonded by a needling process.

More recently, nonwoven geotextiles have been disclosed for use with bitumen membranes. Parchem Construction Products Pty Ltd of Wyong, New South Wales, discloses reinforced bituminous sheet membranes that are applied with a torch and are marketed for applications such as foundations, basements, tunnels, roofs, etc. The membranes are reinforced with a non-woven, continuously extruded, spunbonded polyester fabric that is said to be rot proof, resistant to heat, aging and puncture, and have excellent elongation. The disclosed sheets are said to have thicknesses ranging from about 3 to about 4 mm, or 4.5 mm with a mineral finish. The lower face of the membrane is made with a sacrificial polyethylene film that prevents sticking during storage and is rapidly burned off with a torch during installation.

American Colloid Company has patented in U.S. Pat. No. 5,389,166 a water barrier formed from a clay-fiber mat, and related method. The University of Illinois has patented in U.S. Pat. No. 6,518,330 a multifunctional, autonomically healing composite material comprising embedded capsules that release a healing agent into a crack plane when damage occurs. The healing agent is polymerized by contact with an activator to bond the crack faces. The technology is disclosed for use in applications ranging from microelectronics to composite airplane wings.

Notwithstanding the materials and products that have previously been disclosed for use in waterproofing concrete walls and slabs, and for blocking and stabilizing cracks occurring in such walls and slabs, there remains a need for a membrane that is strong, durable, readily attachable to concrete, relatively inelastic, and substantially impermeable to pooled or migrating groundwater or moisture vapor.

SUMMARY OF THE INVENTION

An invention is disclosed herein that provides a higher level of protection and rehabilitation for concrete slabs and foundation walls than was previously known. The layered composite membranes of the invention provide stress relief that can reduce the amount and severity of cracking in a concrete wall or slab; that continue to function as a seal, even if the wall or slab cracks or a joint opens adjacent to the membrane; that are self-healing if small punctures occur; and that act as a barrier to water, moisture, vapor, insects, pesticides, radioactive radon gas, methane gas, and other toxic contaminants. The membranes of the invention preferably comprise a layer of rubber-modified asphalt having cold flow properties that enable it to fill small voided areas in the base beneath concrete slabs, thereby helping to relieve stress, and to fill small punctures in the membrane that may occur during installation or use.

One preferred embodiment of the invention is a flexible, layered composite membrane comprising a layer of rubberized asphalt disposed between adhered layers flexible plastic sheet material and a geotextile. The geotextile component of the invention is a commercially available, high strength, fibrous fabric that exhibits low elongation and provides extremely high resistance to damage or abuse during construction and also forms a mechanical bond between the underseal membrane and concrete poured over or against it. This embodiment of the invention is particularly useful for underslab applications using a membrane comprising a thick plastic sheet and for blindside applications using a membrane a conformable plastic sheet having a thickness and strength that provide good puncture resistance.

A second embodiment of the invention is a "peel and stick" membrane comprising a rubberized asphalt layer having a layer of heavy but flexible plastic sheet material, most preferably polyethylene, adhered to one side and a releasable, peel-away film or release paper liner disposed on the other side. This embodiment of the invention is particularly useful for split slab and foundation wall applications.

As noted above, the composite membranes of the invention can be advantageously utilized to create a permanent seal in positive side, blindside, underslab or split slab applications as needed. Where desired, the subject membranes can also be used in combination with a drainage mat, low flow fabric, extruded netting or other similarly effective material positioned adjacent to the flexible plastic sheet material and designed to channel away moisture. The overall thickness of the layered composite membranes of the invention can vary but preferably range from about 30 mils to about 150 mils, and most preferably from about 65 mils to about 95 mils (1.65 to 2.41 mm).

A method for relieving stress and reducing crack formation or propagation in concrete slabs and foundation walls through use of the subject composite membranes and methods for installing the membranes in positive side, blindside, underslab, split-slab and foundation wall applications are also disclosed.

BRIEF DESCRIPTION OF THE DRAWINGS

The apparatus of the invention is further described and explained in relation to the following drawings wherein.

DESCRIPTION OF THE PREFERRED EMBODIMENTS

Figure 1:
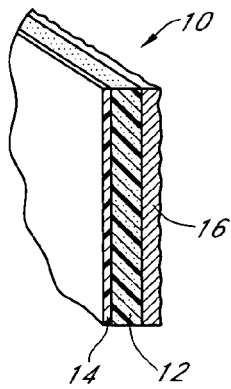
FIG. 1 is a detail perspective view, partially in cross-section depicting one embodiment of a preferred membrane of the invention.

Referring to FIG. 1, waterproof composite membrane 10 of the invention preferably comprises three principal layers, including a stress-absorbing layer 12 of rubberized asphalt, preferably a bitumen-based formulation, sandwiched between a continuously bonded, strong, flexible plastic film layer 14 and a continuously bonded geotextile layer 16. The overall thickness of membrane 10 preferably ranges from about 30 to about 150 mils, and most preferably, from about 65 to about 95 mils.

Rubberized asphalt layer 12 of membrane 10 is desirably a bitumen material that is modified by incorporating into it by conventional means from about 5 to about 20 weight percent, and most preferably from about 10 to about 15 weight percent, of a rubbery block copolymer. Preferred block copolymers for use as the rubberized asphalt layer 12 are styrene-butadiene-styrene (SBS) rubber and styrene-isoprene-styrene (SIS) rubber. During manufacture of membrane 10, rubberized asphalt layer 12 and plastic film layer 14 can be placed in contact while the rubberized asphalt is still relatively warm, causing them to adhere to each other.

Plastic film layer 14 is preferably a heavy gauge, flexible plastic film having a thickness of from about 10 to about 25 mils. High density polyethylene is preferred for use as layer 14 because of its moisture resistance and because it is a known barrier to insects such as termites. A polyethylene layer 14 having a thickness of about 20 mils is particularly preferred because films of that thickness provide good durability and moisture resistance while maintaining a desired degree of flexibility. It should be appreciated, however, that plastic films having thicknesses as low as 1 or 2 mils and as great as 30 mils can also be used for some applications in combination with the rubberized asphalt and geotextile layers as described herein. Thicker film layers 14 are particularly beneficial where membrane 10 is likely to be used in environments in which the membrane needs to span cracks or joints, to absorb stresses, or to withstand cyclical loading or higher water volumes. Plastic films having lesser thicknesses of, for example, about 4 mils can be used satisfactorily where the film is cross-laminated and therefore still provides good puncture resistance. As used herein, "cross-laminated" refers to a process by which a polymeric film is biaxially stretched, laminated to a substrate film and then stretched again in a third direction in the same plane. Such films have very good flexibility and extremely high strength for a given thickness, and function particularly well in composite membranes 10 used for vertical wall applications because the resultant membranes readily conform to surface irregularities in a wall.

Although high density polyethylene is preferred for use in the invention, it will be appreciated that other olefinic polymers and other similarly effective polymeric materials can likewise be used in the subject composite membranes. It should also be understood that the material used for making heavy gauge plastic film layer 14 can also contain other components such as pigments, fillers, ultraviolet light stabilizers and the like without departing from the invention. Thus, for example, relatively minor amounts of titanium dioxide can be incorporated as an additive for producing films having a white color and carbon black can be used to impart a black color to the resultant plastic film layer.

The geotextile used in geotextile layer 16 of the invention can be woven, non-woven, knitted or spun-bonded, but is most preferably non-woven and comprises randomly directed synthetic fibers, most preferably polypropylene. Geotextile layer 16 performs two principal functions: First, it strengthens composite membrane 10 and is highly resistant to elongation or stretching in relation to the rubberized asphalt and polyethylene layers; and second, it facilitates bonding of membrane 10 to newly poured concrete or to an adhesive in those circumstances where the use of an adhesive is desired. Woven geotextiles provide greater strength and resistance to elongation in the perpendicular directions of the weave, but non-woven geotextiles provide excellent strength in all directions. Non-woven geotextiles also tend to be more "fuzzy" and have a lot of fibers that project outwardly from the material in random directions, providing better bonding to the concrete. Geotextile layer 16 most preferably comprises a mat of randomly oriented synthetic fibers that is placed in contact with rubberized asphalt layer 12 while layer 12 is still warm, soft and tacky so that geotextile layer 16 will become bonded to rubberized asphalt layer 12 as the asphalt cools. A particularly preferred synthetic material for use in the fibers that make up geotextile layer 16 is polypropylene, although other olefinic polymers, preferably poly-alpha-olefins and polyesters, can also be used for some applications. Because various individual fibers of geotextile layer 16 are physically connected, bonded or intertwined, geotextile layer 16 is resistant to stretching and elongation, providing excellent dimensional stability to composite membrane 10. Geotextile materials comprising woven or non-woven polypropylene fibers are commercially available from numerous sources. In applying geotextile layer 16 to membrane 10, strips along the edges of rubberized asphalt layer 12 are preferably left uncovered to facilitate overlapping and bonding to adjacent membranes 10 during installation.

During installation of composite membrane 10, the outwardly facing fibers disposed at or near the surface of geotextile layer 16 provide a good interface for bonding when wet concrete is poured over, or adjacent to, layer 16. Such installations are discussed in greater detail below in relation to FIGS. 2, 4, 5 and 7, although it will be appreciated by those of ordinary skill in the art upon reading this disclosure that membrane 10 as described above can also be used effectively for many other purposes. It should also be understood that composite membrane 10 can be used in connection with substrate surfaces disposed at any angle or inclination, although vertical and horizontal surfaces are depicted in relation to the preferred embodiments as shown in the accompanying drawings. The term "substrate," as used below, refers to any facing and contacting surface to which either side of composite membrane 10 is applied, regardless of its inclination and whether it is disposed above, below or beside the membrane. In circumstances where geotextile layer 16 is to be attached to a surface other than wet concrete, it can also be used effectively with any suitable, known adhesive that is chemically compatible with the synthetic fibers of the geotextile layer.

Figure 2:
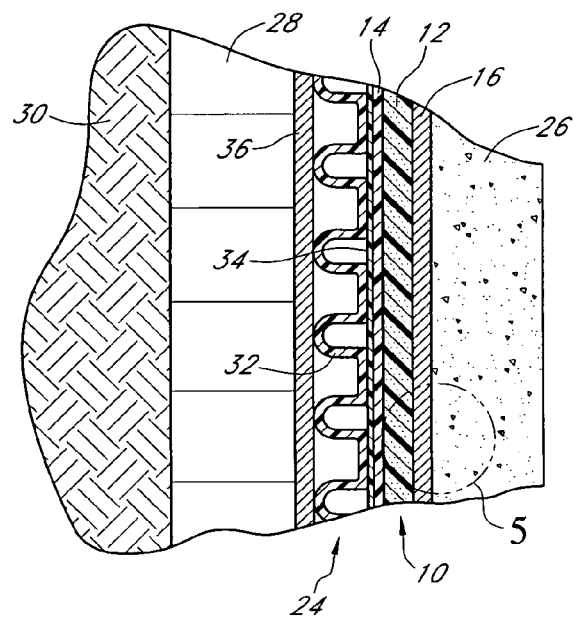
FIG. 2 is a cross-sectional elevation view, partially broken away, showing a blindside installation in which the membrane of FIG. 1 is disposed vertically between a drainage mat and a concrete wall poured against it.
Figure 7:
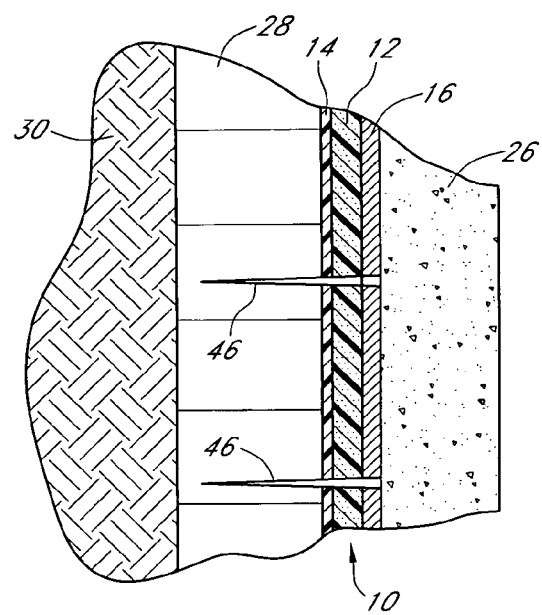
FIG. 7 is a cross-sectional elevation view, partially broken away, showing a blind-side installation in which the membrane of FIG. 1 is installed vertically, fastened to lagging, with a concrete wall poured against it.

FIG. 2 discloses one typical blindside installation of composite membrane 10 in which lagging 28 is installed vertically next to soil 30 and drainage composite 24 and composite membrane 10 are attached to the side of lagging 28 that is opposite soil 30 prior to pouring concrete wall 26. Drainage composite 24, sometimes called drainage board, or another similarly effective structure such as low flow fabric or extruded netting, is preferably placed between lagging 28 and membrane 10. As shown, drainage composite 24 further comprises a thermoformed substrate 32, preferably made of polystyrene, having a thin layer of polymeric film 34 bonded to the side facing membrane 10, and a geotextile layer 36 facing lagging 28. Drainage composite 24 facilitates the drainage of any water that might otherwise seep into the space between lagging 28 and concrete wall 26. Plastic film layer 14 of composite membrane 10 is disposed in facing contact with plastic film side 34 of drainage composite 24, and both are preferably secured to lagging 28 using suitable commercially available fasteners, adhesive, tape, or the like, as desired. Although not visible in FIG. 2, one type of suitable fastener 46 is depicted in FIG. 7. Normally, for applications up to about 20 feet in width, composite membrane 10 and drainage composite 24 or another similarly effective drainage product, if used, can be satisfactorily attached to lagging 28 by applying fasteners 46 about 12 inches apart across the top and allowing membrane 10 to hang down the wall pending pouring of the concrete against geotextile layer 16. In composite membranes 10 intended for use in vertical applications, thinner or softer materials are sometimes used than for horizontal applications because of their greater flexibility and because membrane 10 is less likely to be placed in a load-bearing situation.

Figure 5:
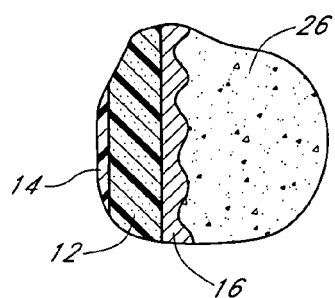
FIG. 5 is an enlarged detail view taken from FIG. 2 that better depicts the structure of the geotextile layer of the membrane of the invention and the interface between the geotextile layer and the concrete to which it is bonded.

After drainage composite 24 and composite membrane 10 are in place, concrete wall 26 is poured against geotextile layer 16, and the wet concrete bonds to fibers of geotextile layer 16 as the concrete cures. FIG. 5 better illustrates the bonding interface between geotextile layer 16 and concrete wall 26. When freshly poured, the wet concrete surrounds the surface fibers of geotextile layer 16 and permeates substantially all of geotextile layer 16. When the concrete layer does come in contact with the rubberized asphalt layer 12 beneath the geotextile layer 16, it also assists the bond. As the concrete cures, geotextile layer 16 and concrete wall 26 become bonded to each other. FIG. 7 depicts a similar blindside installation in which composite membrane 10 as described above is used without drainage composite 24 as shown in FIG. 2, and is secured by fasteners 46 directly to lagging 28 in front of soil wall 30.

Figure 4:
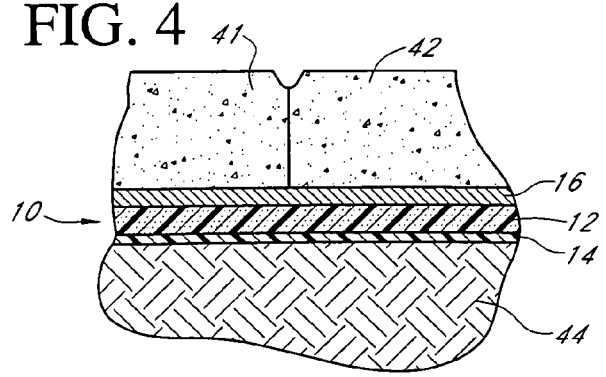
FIG. 4 is a cross-sectional elevation view, partially broken away, showing an underslab installation in which the membrane of FIG. 1 is disposed horizontally on underlying compacted base materials or soil with the polyethylene layer facing down, and side-by-side sections of a concrete slab are poured over the upwardly facing geotextile layer of the membrane.

FIG. 4 depicts composite membrane 10 of the invention, comprising strong plastic film, rubberized asphalt and geotextile layers 14, 12, 16, respectively, installed in an underslab application between compacted base materials or soil 44 and overlying concrete slab sections 41, 42. Composite membrane 10 is desirably installed with plastic film layer 14 facing downward against the compacted base materials or soil 44 and with geotextile layer 16 facing upward. When slab sections 41, 42 are poured over membrane 10, the wet concrete infiltrates the fibrous geotextile layer 16 and later hardens to bond the slabs to membrane 10. The joint between adjacent slab sections 41, 42 is representative of a situation in which the strength and stress-relieving properties of composite membrane 10 are particularly important. Ordinarily, differential settling of the base or soil 44 can cause one of slab sections 41, 42 to cant or buckle relative to the other, opening the joint between them or causing a crack in the slab itself. Such opening or cracking can similarly be caused by other situations including, for example, freeze/thaw expansion or curling due to temperature differentials between the slabs. However, with composite membrane 10 of the invention installed beneath the slab sections, rubberized asphalt 12 can cold flow into any void created by subsiding soil while geotextile layer 16 and strong plastic film layer 14 cooperate to maintain the membrane integrity and plastic film layer 14 provides a moisture barrier under the slab.

Figure 6:
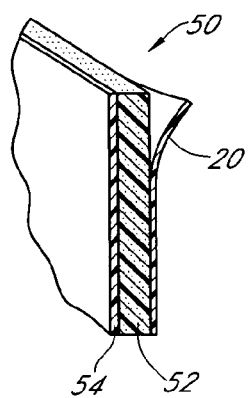
FIG. 6 is a detail perspective view of a "peel and stick" membrane comprising a polyethylene layer and rubberized asphalt layer, and having a peel-away release liner adhered to the rubberized asphalt layer.

FIG. 6 depicts the "peel and stick" embodiment of the invention in which composite membrane 50 comprises a relatively thicker bitumen or rubberized asphalt layer 52 bonded on one side to a strong plastic film layer 54 and having a release liner 20 disposed on the other side. Composite membrane 50 is particularly preferred for use in split slab and foundation wall applications. Rubberized asphalt layer 52 and plastic film layer 54 can be made as previously described in relation to the corresponding layers of composite membrane 10, with the same overall range of thicknesses. With this embodiment, however, rubberized asphalt layer 52 is typically thicker than for composite membrane 10 and plastic film layer 54 is preferably a heavier gauge material than for plastic layer 14, and typically constitutes from about ¼ to about ⅓ of the overall thickness of membrane 50. Polyethylene is again the preferred material for use as the plastic film layer. Release liner 20 is preferably also a polymeric film having a thickness of about 2 to about 4 mils that is pre-coated with a silicone release agent. Preferred materials for use as the film portion of release liner 20 include polyolefins such as polyethylene and polypropylene, although polyester films or even coated paper can also be used. Where a polyester release liner 20 is used, it may be thinner than 2 mils. Composite membrane 50 is preferably made by various methods such as, for example, pumping rubberized asphalt into pans or onto belts as a viscous liquid, then laying down the plastic sheet layer 54 over the rubberized asphalt layer 52 so that the two layers can bond as the rubberized asphalt cools. A pinch roll can be used to promote even contact and eliminate air pockets between the rubberized asphalt layer 52 and plastic layer 54 if desired.

Figure 3:
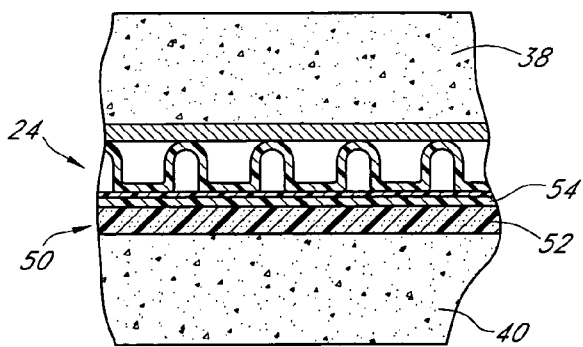
FIG. 3 is a cross-sectional elevation view, partially broken away, showing a split slab installation in which a "peel and stick" membrane as described in relation to FIG. 6 is installed over an underlying concrete slab with the rubberized asphalt layer facing down, a drainage mat is disposed over the membrane, and a second concrete slab is poured over the upwardly facing geotextile surface of the drainage mat.
Figure 8:
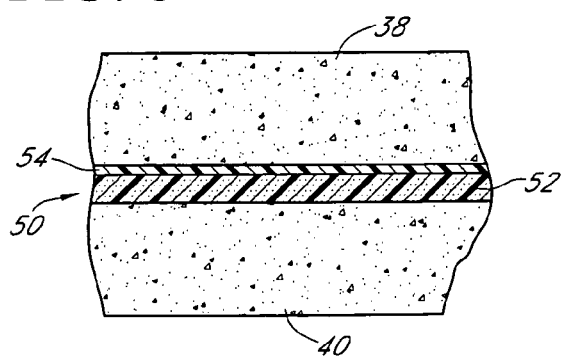
FIG. 8 is a cross-sectional elevation view, partially broken away, showing a split slab installation in which the membrane of FIG. 6 is disposed horizontally over a concrete slab with the rubberized asphalt layer facing down prior to pouring the overlying concrete layer.

FIG. 3 depicts a split slab installation in which membrane 50 as previously described is installed over lower slab 40 after release liner 20, as shown in FIG. 6, is removed. Rubberized asphalt layer 52 of membrane 50 is placed in contact with the upwardly facing surface of lower slab 40, with plastic film layer 54 facing up. Drainage composite 24, previously described in relation to FIG. 2, or another similarly effective drainage product, is installed over plastic layer 54 so that the textile side of drainage composite 24 is facing upwardly and away from composite membrane 50. Desirably, an adhesive layer (not shown) is applied between plastic film layer 54 and the underside of drainage composite 24. After composite membrane 50 and drainage composite 24 are installed over bottom slab 40, top slab 38 is poured over the upwardly facing textile layer of drainage composite 24, and becomes bonded to it as the concrete cures. FIG. 8 discloses a split slab application in which no drainage product is applied over plastic film layer 54 of composite membrane 50, and top slab 38 is poured directly onto composite membrane 50.

Figure 9:
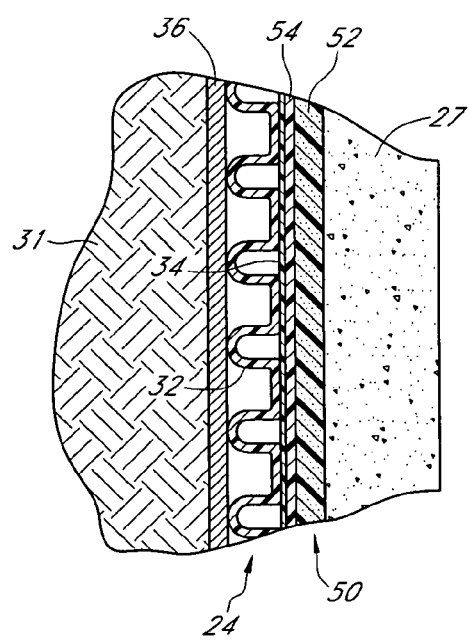
FIG. 9 is a cross-sectional elevation view, partially broken away, showing a positive side installation in which the membrane of FIG. 6 is installed with the rubberized asphalt layer having been pressed against and adhered to a concrete wall that is already in place.

FIG. 9 discloses a positive side foundation wall application in which composite membrane 50 as described above in relation to FIG. 6 is installed against foundation wall 27 by pressing rubberized asphalt layer 52 against wall 27 after the release liner (not shown) is removed. A drainage product such as drainage composite 24, previously described, is then applied to composite membrane 50 with textile layer 36 facing outwardly, and soil 31 is backfilled against the protected wall 27.

According to another embodiment of the invention, a method is disclosed for relieving stress and reducing crack formation or propagation in concrete slabs or walls through the selective use of either a composite membrane 10 or a composite membrane 50 as described above, depending upon the intended application. Composite membranes 10 are preferred for use in underslab and blindside applications, while composite membranes 50 are preferred for use in split slab and foundation wall applications.

Referring again to FIG. 7, for blindside applications, composite membrane 10 is desirably applied with geotextile layer 16 facing the wall to be poured and with plastic film layer 14 facing away. Although blind side applications utilizing lagging 28 are described above and shown in the accompanying drawings in relation to a preferred embodiment, it should be appreciated that membrane 10 can also be applied against caisson, shotcrete, slurry seal or steel piling walls, and with or without drainage board 24. Side laps are desirably furnished with edge strip of about 4 inches for use in making an overlapped seam. The edge strips of the membrane should be cleaned to remove any debris or dust from plastic layer 14. A liquid adhesive is desirably applied to the top of membrane 10 at the seams, using a roller pressure to obtain full adhesion. If the annular space around any opening where a pipe, bolt, or the like, penetrates membrane 10 is 0.5 in. or less, liquid adhesive is desirably applied to the geotextile side of membrane 10. A 0.75 in. cant or fillet of liquid membrane is then desirably applied around the pipe, etc., extending approximately 3 in. onto the geotextile side of membrane 10. If the annular space exceeds about 0.5 in., a patch of fabric seal tape is preferred for use in establishing a seal. The patch should extend about 6 in. around the opening and should be applied and then coated using liquid adhesive. For full termite protection, any pipe penetrating membrane 10 should be wrapped using fabric tape and a screw clamp.

For underslab applications, composite membrane 10 is desirably applied with the plastic film layer 14 placed against the soil, and with geotextile layer 16 facing upwardly. Membrane 10 is preferably unrolled with the longest dimension parallel to the direction of pour. Membrane 10 should be lapped over footings and sealed to foundation walls. Side and end seams should be cleaned as described above for blindside applications, and overlapped using the 4 inch edge seal for side seams and at least a 6 in. overlap for end seams. End seams should be coated with liquid adhesive and rolled to promote adhesion. A 12 in. width of fabric tape is preferably centered over each end seam to insure complete sealing. Any openings penetrating membrane 10, such as may occur with pipes passing vertically through the membrane, are preferably sealed as previously described. Steel reinforcements can be applied directly over composite membrane 10. It is important that any rebar chairs placed over membrane 10 be compatible with the system. Steel chairs and bolsters should be plastic dipped or have plastic caps to reduce the likelihood of accidental punctures. Precaution should also be taken to protect composite membrane 10 during placement of reinforcing structures and the pouring of concrete over the membrane. Accidental punctures too large to be self-healing by the cold flow properties of rubberized asphalt layer 12 should be patched using liquid adhesive and fabric tape.

For split-slab applications, the upwardly facing surface of the lower slab is first desirably primed by cleaning it thoroughly and applying liquid adhesive. Peel and stick composite membrane 50 should then be applied to the primed surface starting at the low point and working to the high point in a shingling technique. Side laps should be a minimum of 2.5 in. and end laps a minimum of 6 in. The entire membrane 50 should be firmly rolled with a linoleum roller weighing approximately 75 pounds to insure excellent adhesion and minimize air pockets between the substrate and membrane. Seams and penetrations should be sealed as previously described. Membrane 50 should be turned up on walls and should be terminated into a reglet or under a counter flashing. Membrane 50 can also be pressed firmly to a wall, then sealed with a troweled bead of mastic. All inside and outside corners should be treated with a 12 in. strip of seal tape. All inside corners should have a minimum 1 in. fillet of liquid membrane or latex-modified cement mortar. All permanently exposed laps should be sealed with a 0.5 in. bead of mastic. At completion of horizontal membrane application, the surface of composite membrane 50 should desirably be flood tested with about two inches of water for 24 hours. Any leak areas found during flood testing should be repaired. With horizontal applications of this type, the use of protection board over membrane 50 is recommended where the use of structural steel, heavy rebar or truck traffic is expected.

When properly applied as described herein, the composite membranes of the invention provide unprecedented advantages over prior art membranes with respect to preventing and rehabilitating cracks and other leaks in concrete slabs and foundation walls, and in relieving stress that can produce or propagate such cracks. In addition, the subject membrane provides an excellent barrier to the passage of moisture, groundwater, radioactive or otherwise toxic gases and chemicals, pesticides, insects, and the like, through such slabs and walls.

Other alterations and modifications of the invention will become apparent to those of ordinary skill in the art upon reading this specification in view of the accompanying drawings, and it is intended that the scope of the invention disclosed herein be limited only by the broadest interpretation of the appended claims to which the inventor is legally entitled.

What is claimed:

1. A method for reducing crack formation and propagation in concrete slabs and walls, comprising the steps of:
   providing a composite membrane having a heavy plastic film layer on a first side, a geotextile layer on a second side, and a rubberized asphalt layer disposed between the two sides;
   applying the composite membrane to a substrate with a durable plastic film layer facing and contacting the substrate; and thereafter
   pouring concrete against the geotextile layer to bond the composite membrane to the concrete.
2. The method of claim 1 wherein the substrate is cleaned with alcohol prior to applying the composite membrane.
3. The method of claim 2 wherein the composite membrane is applied to the substrate with an adhesive.
4. The method of claim 1 wherein the composite membrane is applied to the substrate using fastener devices.
5. The method of claim 1 wherein the composite membrane further comprises edge portions which do not have a geotextile layer and wherein at least one such edge portion is overlapped with an edge portion of an adjacent composite membrane.
6. The method of claim 5 wherein the overlap is sealed with a liquid adhesive.
7. The method of claim 6 wherein the overlap is sealed with fabric tape.
8. The method of claim 5 wherein the overlap is compressed with a pressure roller.
9. The method of claim 1 wherein the composite membrane has a thickness ranging from about 30 mils to about 150 mils.
10. The method of claim 9 wherein the composite membrane has a thickness ranging from about 65 to about 95 mils.
11. The method of claim 1 wherein the plastic film layer comprises polyethylene.
12. The method of claim 1 wherein the plastic film layer has a thickness of about 20 mils.
13. The method of claim 1 wherein the rubberized asphalt comprises from about 5 to about 20 weight percent rubber.
14. The method of claim 13 wherein the rubberized asphalt comprises from about 10 to about 15 weight percent rubber.
15. The method of claim 1 wherein the rubberized asphalt is modified with a block copolymer.
16. The method of claim 15 wherein the block copolymer is styrene-butadiene-styrene.
17. The method of claim 15 wherein the block copolymer is styrene-isoprene-styrene.
18. The method of claim 1 wherein the geotextile is non-woven.
19. The method of claim 1 comprising the additional step of placing a drainage board against the substrate prior to applying the composite membrane.
20. The method of claim 1 wherein the composite membrane is applied in an underslab installation.

* * * * *